Aug. 4, 1964 C. R. SPERO 3,143,264
LUGGAGE CARRIERS
Filed April 30, 1962

INVENTOR:
Charles R. Spero
BY
Gary, Desmond & Parker
Attys

United States Patent Office 3,143,264
Patented Aug. 4, 1964

3,143,264
LUGGAGE CARRIERS
Charles R. Spero, 5950 N. Winthrop Ave., Chicago, Ill.
Filed Apr. 30, 1962, Ser. No. 190,934
1 Claim. (Cl. 224—42.1)

This invention relates to luggage carriers for automobiles and is especially concerned with a luggage carrier adapted for convenient use with modern compact or sports cars.

In recent years there has been a marked increase in the use of small compact automobiles which suffer the disadvantage of limited trunk or storage space. To mitigate this disadvantage, external carrier devices have been proposed to accommodate the carrying of excess luggage or other loads on the roof or trunk lid, i.e., the lid of the compartment at the rear of the automobile. However, these devices have failed to satisfy the demands of users due to excessive bulk, high cost and difficulty of use.

It is the principal object of this invention to provide an improved luggage carrier of compact and economical design particularly adapted for use on the trunk lid of a vehicle.

It is also an object of the invention to provide an improved luggage carrier having connecting means facilitating its attachment to and removal from a vehicle, and that is lightweight and readily manipulated to facilitate its quick attachment and detachment.

Another object of the invention is to provide a luggage carrier that is collapsible and can easily be altered between an expanded load carrying condition and a contracted or folded compact storage condition whereby it may readily be stored in a minimum of space in the trunk compartment of the vehicle.

A further object is the provision of a luggage carrier of simple construction adapted to be folded and unfolded by scissors type movement between its load carrying and collapsed conditions.

A still further object is the provision of a luggage carrier having improved binding means for securing a load on the carrier, including a first flexible binder connected between two fixed eyes or loops on the lateral margins of the carrier and joined at its mid-region to a second flexible binder encircled in a loop about the load and the load support region of the carrier.

Other objects and advantages of the invention will become apparent in the following detailed description.

Now, in order to acquaint those skilled in the art with the manner of making and using my improved luggage carrier, I shall describe, in connection with the accompanying drawings, a preferred embodiment of the carrier and the preferred manner of making and using the same.

Figure 1:
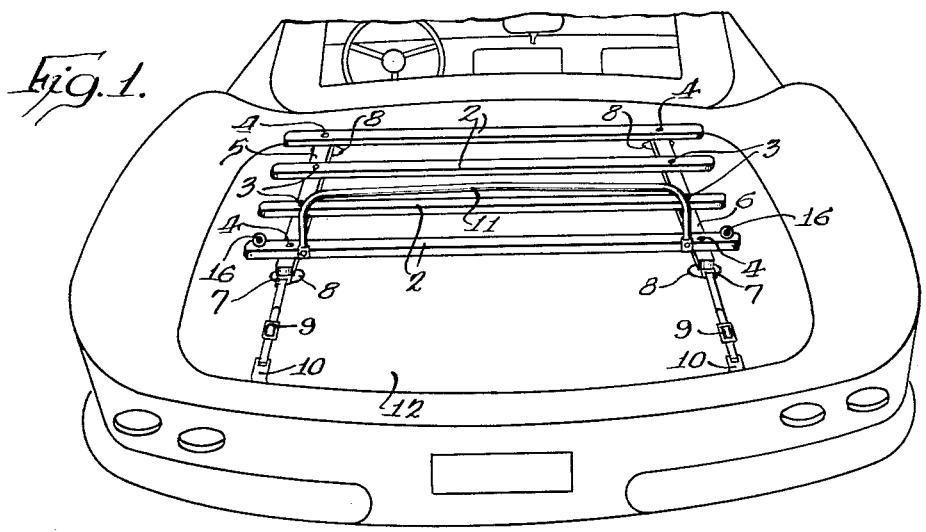
FIGURE 1 is a perspective view of the rear portion of a compact automobile provided on its trunk lid with the luggage carrier of the invention.
Figure 2:
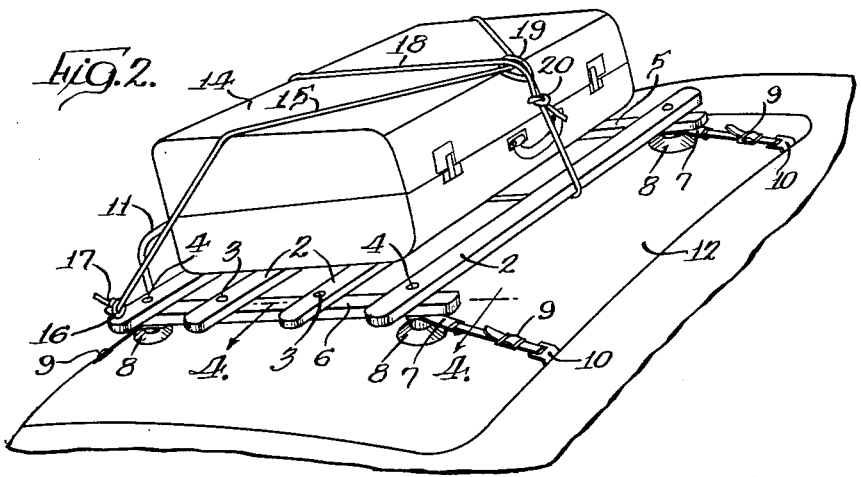
FIGURE 2 is a three-quarter perspective view of the portion of the vehicle shown in FIGURE 1, the view being taken from the right side of the vehicle and showing the manner in which a load may be secured in place on the carrier.

As shown particularly in FIGURES 1 and 2, a preferred embodiment of the luggage carrier of this invention comprises a plurality of load supporting rails 2 extending transversely of the vehicle and disposed in spaced parallel and preferably coextensive relation in the expanded position of the carrier. Each rail 2 is pivotally secured adjacent its ends by bolts 3 and 4 to the upper surfaces of two rail supports or mounts 5 and 6. The mounts 5 and 6 are spaced apart and extend parallel to each other longitudinally of the vehicle.

Figure 4:
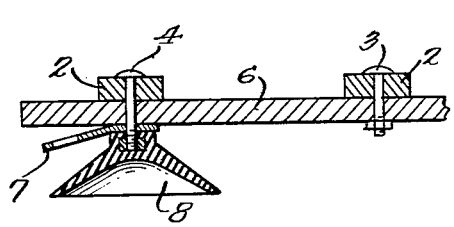
FIGURE 4 is a sectional view taken substantially along line 4—4 of FIGURE 3.

The bolts 3 are shorter than the bolts 4 because the bolts 3 function only to join the end of a rail 2 to a mount 5 or 6. The bolts 4 are longer because they must extend further to also secure four strap connectors 7 and four flexible suction cups 8 (FIGURE 4) to the assembly adjacent the four corners of the carrier.

Four adjustable length straps 9 are provided, one for each connector 7, and each strap 9 is provided with a rigid hook 10 at its free end.

A guard rail 11 is provided on the rearwardmost support rail 2 against which a load can bear for secure positioning. The guard rail is secured at its ends rigidly to the carrier and projects upwardly from it.

When in load carrying condition, the carrier is centrally located, as shown in FIGURES 1 and 2, on the lid 12 of the compartment which ordinarily comprises the trunk of the vehicle. The suction cups 8 are pressed into tight engagement with the lid surface and the hooks 10 at the ends of the straps 9 are hooked into engagement around the leading and trailing marginal edges of the lid 12. The straps 9 are adjusted in length after engagement to draw them taut and insure that the carrier is held tightly in one location on the lid. The hooks 10 do not interfere with opening and closing of the lid 12 on most vehicles, but should there be interference the hooks may be replaced by U-bolt or strap fittings of known type secured directly to the lid.

To secure a load, such as a suitcase 14, to the carrier the load is positioned centrally on the support rails 2 with its rear surface bearing snugly against the guard rail 11, and the load is then strapped to the carrier by a three-legged binder assembly. The binder assembly is comprised of two legs which are secured adjacent the opposite ends of the rear support rail 2 and extend diagonally toward one another over the sides of the load and forwardly to adjacent the center of the leading edge of the load, and a third leg secured to said two legs at the point of convergence thereof and wrapped about the longitudinal center line of the carrier and the load, thereby fixedly to secure the load to the carrier.

In its preferred embodiment, the binder assembly is comprised of two lengths of flexible rope or strap, namely, a first binder 15 forming the two diagonal legs and a second binder 18 comprising said third leg. The first binder 15 is secured between two loops or eyes 16 which are fastened adjacent the ends of the rear rail 2. A simple way of securing the first binder 15 is by passing each of its ends through its respective eye 16 and tying a knot 17 in the free portion of the binder extending beyond the eye. If the knot is larger than the opening of the eye, it cannot pass through it. Also by this expedient, the length of the binder 15 can readily be adjusted. The second flexible binder 18 is in the form of a strap or rope having a loop 19 woven in one of its ends through which the first binder is passed, the binder 18 being adapted to be reaved around the carrier and the load, drawn taut and tied upon itself adjacent the loop 19, as indicated at 20, thereby to define the three legged arrangement and to attach the load 14 securely on the carrier.

Figure 3:
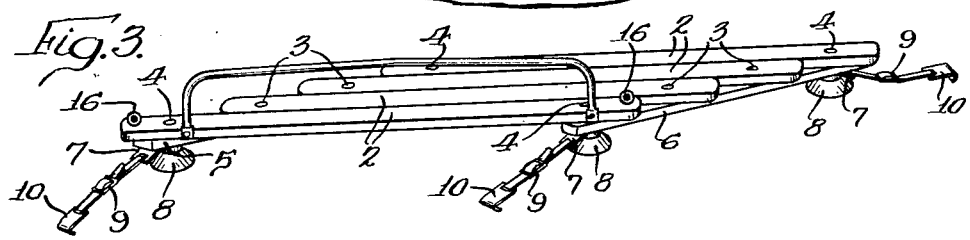
FIGURE 3 is a perspective view of the carrier in its collapsed or storage condition.

When it is desired to store the carrier, the straps 9 are loosened to allow the hooks 10 to disengage from the edges of the lid 12. The carrier is then lifted from the lid and the rails 2 are pivoted in scissors fashion on their pivot bolts 3 and 4 relative to the rail mounts 5 and 6 to the collapsed storage condition shown in FIGURE 3, wherein the rails 2 are abutted against one another and the mounts 5 and 6 extend at an angle to the rails 2 rather than at right angles thereto as when the carrier is in its load carrying condition. In its collapsed condition the carrier is compact enough to be conveniently stored in the compartment covered by the lid 12.

While the particular carrier illustrated in the drawings is intended for generally universal application to the trunk lids and roofs of a wide variety of automobiles (the same being shown as applied to the trunk lid of a Chevrolet Corvette), it will be appreciated that the size and number of the support rails 2 may be varied as desired or necessary to accommodate the carrier to substantially any vehicle, and that the suction cups may be relocated if necessary. For example, to mount the illustrated carrier on the trunk lid of a Triumph automobile, it is preferable to locate the suction cups on the first and third support rails, and for a Porsche, it is preferable to replace the suction cups with small rubber pads. In any event, however, the carrier is comprised basically of a plurality of support rails 2 pivotally connected to a pair of base or mounting rails 5 and 6 whereby the unit is collapsible and extensible. The rails 2, 5 and 6 may be fabricated of any desired light-weight, inexpensive material, such as wood or aluminum, and the components are assembled expeditiously and economically simply by bolts 3 and 4 which connect the rails, the strap fasteners 7 and the suction cups 8. It is apparent, therefore, that all of the objects and advantages of the invention have been shown herein to be attained in a convenient, economical and practical manner. Although only a single preferred embodiment has been shown and described, it should be clearly understood that the carrier of the invention can be made in many different ways without departing from the scope of the invention as defined by the appended claim.

I claim:

A carrier adapted to be mounted on the trunk lid of a vehicle comprising a plurality of substantially parallel load support rails mounted adjacent their ends at pivots on spaced apart rail mounts extending substantially parallel to each other, said rail mounts being provided with downwardly extending friction means for engagement with the trunk lid, the rails being movable at said pivots angularly in scissors fashion relative to the rail mounts to alter the shape of the carrier between an expanded load carrying condition and a collapsed storage condition, the rails being spaced from each other and the rail mounts extending substantially perpendicular to the rails when the carrier is in its expanded load carrying condition, the transverse spacing between the rails being diminished and the rail mounts extending in non-perpendicular direction to the rails when the carrier is in its collapsed storage condition, said rail mounts having flexible connecting means for engagement with the trunk lid for keeping the carrier located in a fixed position on the lid, said connecting means being adjustable in length to adapt the carrier to different size lids and to allow the connecting means to be drawn taut, said rails having flexible binding means connected thereto for securing a load positioned thereon, said flexible binding means including a first flexible member which is secured between two spaced apart loops mounted on the side portions of the carrier and a second flexible member encircled into a closed loop around the top and front sides of the load and the bottom of the rails centrally of the rails, the second flexible member being engaged with the central portion of said first flexible member.

References Cited in the file of this patent
UNITED STATES PATENTS

| | | |
|---|---|---|
| 163,928 | Heath | June 1, 1875 |
| 1,505,854 | Branscum | Aug. 19, 1924 |
| 2,423,253 | Potts et al. | July 1, 1947 |
| 2,594,319 | Law | Apr. 29, 1952 |
| 2,788,929 | Gallagher | Apr. 16, 1957 |
| 2,809,008 | Halverson | Oct. 8, 1957 |

FOREIGN PATENTS

| | | |
|---|---|---|
| 454,248 | Italy | Jan. 14, 1950 |